US007603808B2

(12) United States Patent
Carpenter et al.

(10) Patent No.: US 7,603,808 B2
(45) Date of Patent: Oct. 20, 2009

(54) VEGETATION ROOFING SYSTEM (75) Inventors: Mark M. Carpenter, Tualatin, OR (US); Raymond B. DuVal, III, Wilsonville, OR (US)

(73) Assignee: Columbia Green Technologies, Inc., Tualatin, OR (US)

( * ) Notice: Subject to any disclaimer, the term of this patent is extended or adjusted under 35 U.S.C. 154(b) by 0 days.

(21) Appl. No.: 11/621,294

(22) Filed: Jan. 9, 2007

(65) Prior Publication Data
US 2007/0157514 A1 Jul. 12, 2007

Related U.S. Application Data (60) Provisional application No. 60/757,768, filed on Jan. 9, 2006.

(51) Int. Cl.
*A01G 9/02* (2006.01)
*A47G 19/00* (2006.01)
(52) U.S. Cl. .......................................... 47/65.9; 47/65.5
(58) Field of Classification Search ................... 47/65.5, 47/66.1, 86, 65.9, 65.6, 67, 85
See application file for complete search history.

(56) References Cited

U.S. PATENT DOCUMENTS

| 986,395 | A | * | 3/1911 | King ............................... 47/33 |
| 1,996,898 | A | * | 4/1935 | Brandell ...................... 47/65.6 |
| 3,683,549 | A | * | 8/1972 | Simmon ......................... 47/86 |
| 4,118,892 | A | * | 10/1978 | Nakamura et al. ........... 47/65.9 |
| 4,926,586 | A | | 5/1990 | Nagamatsu |
| 4,999,946 | A | * | 3/1991 | DeGiglio et al. ............... 47/73 |
| 5,595,021 | A | * | 1/1997 | Ripley et al. ................. 47/66.5 |
| 5,664,367 | A | * | 9/1997 | Huang ............................ 47/40 |
| 5,740,633 | A | * | 4/1998 | Champagne .................... 52/11 |
| 6,253,487 | B1 | * | 7/2001 | Yoshida et al. ................. 47/33 |
| 6,606,823 | B1 | | 8/2003 | McDonough et al. |
| 6,694,672 | B1 | * | 2/2004 | Hergeth ...................... 47/65.9 |
| 6,711,851 | B2 | | 3/2004 | Mischo |
| 6,862,842 | B2 | | 3/2005 | Mischo |

FOREIGN PATENT DOCUMENTS

DE 4029519 A1 * 3/1992
FR 2567361 A1 * 1/1986

OTHER PUBLICATIONS

Tectagreen greenroof applicators, www.greenroof.com, 2006, TectaGreen.
U.S. Department of Energy, Federal Technology Alert Publication DOE/EE-0298, Sep. 2004, citing Dürr, A., Roof Greening: An Ecological Balance (1995).

* cited by examiner

*Primary Examiner*—Rob Swiatek
*Assistant Examiner*—Kristen C Hayes
(74) *Attorney, Agent, or Firm*—Marger Johnson & McCollom, P.C.

(57) ABSTRACT

A vegetation roofing tray comprising an interconnecting lip is provided. The interconnecting lip on the sidewall of a tray engages with a sidewall of an adjacent tray, securely interconnecting the adjacent trays side-by-side together. A securing device penetrating the sidewalls of adjacent trays may also be used to secure the adjacent trays together.

30 Claims, 12 Drawing Sheets

VEGETATION ROOFING SYSTEM

RELATED APPLICATION DATA

This application claims benefit of U.S. provisional patent application Ser. No. 60/757,768, filed Jan. 9, 2006, titled Vegetation Roofing System, the contents of which are herein incorporated by reference in their entirety.

BACKGROUND

1. Technical Field

The invention relates generally to the field of roof coverings. Specifically, the invention relates to a modular system for providing storm water management and roof-protective vegetation on roof tops.

2. Description of the Related Art

The type of roof covering that is used on a building or dwelling can have a dramatic impact on the living conditions inside. As an example, roof coverings that provide significant solar energy collection can reduce the amount of heat energy transmitted into the living area of a building, which can lead to reduced energy costs (costs associated with cooling the living area) during hot periods. One type of roof covering that has received significant interest recently is a so-called 'green roof' system. Green roof systems typically incorporate some type of vegetation in a roof covering. Green roof systems can lead to reduced energy costs, due to the insulating effects of the vegetation, reduced storm-water runoff, due to the water-absorbing nature of the vegetation and accompanying soil, and environmental advantages, due to increased green space in commercial or other populated areas.

One prior art roof covering is disclosed in U.S. Pat. No. 6,606,823 to McDonough et al (hereinafter "McDonough"). McDonough provides a roof covering system consisting of modular trays that may be used to hold vegetation, absorbent material, or solar cells. The trays in McDonough require several layers of different materials as well as some type of ballast to weigh down the trays. Further, the McDonough trays have a complicated and expensive puzzle-type interlocking frame which leaves a gap between adjacent trays. These gaps represent un-captured roof area that does not realize the benefits of the green roof system. Also, the gaps between the trays allow soil mixture to spill out of the trays and onto the frame between the trays. This spilled soil mixture can lead to water pooling underneath the roofing system and subsequent damage to the roof below the roofing system. Consequently, a roofing system that does not have gaps between adjacent trays and does not require many layers of materials is desired.

Another prior art system is disclosed in U.S. Pat. No. 6,862,842 to Mischo (hereinafter "Mischo"). Mischo provides a modular green roof system that consists of pre-seeded panels that have edge flanges for connection purposes. The flanges of adjacent trays laterally abut or rest on top of each other and must be screwed or bolted together in order to secure the adjacent trays. The edge flanges space the trays apart. These screw or bolt type connections can add significant time and expense to the installation of the Mischo system. Consequently, a roofing system that does not require screwed or bolted connections between adjacent trays is also desired. It is also desired to maximize coverage of the roof by the trays.

The invention addresses these and other disadvantages of conventional roofing systems.

SUMMARY

The disclosure provides a tray for a green roof system and a green roof system utilizing the tray. The tray includes a connecting lip to allow adjacent trays to be secured side-by-side together. The tray also includes a securing device that penetrates the sidewalls of the tray, thereby providing a double locking system.

BRIEF DESCRIPTION OF THE DRAWINGS

The above and other objects, features and advantages of the disclosure will be more clearly understood from the following detailed description taken in conjunction with the accompanying drawings, in which.

DETAILED DESCRIPTION OF PREFERRED EMBODIMENTS

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will fully convey the scope of the disclosure to those skilled in the art. In the drawings, the sizes and relative sizes of layers and regions may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, region, layer or section. Thus, a first element, component, region, layer or section discussed below could be termed a second element, component, region, layer or section without departing from the teachings of the disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, elements, and/or components, but do not preclude the presence or addition of one or more other features, elements, components, and/or groups thereof.

Unless otherwise defined, all terms (including technical and scientific terms) used herein have the same meaning as commonly understood by one skilled in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
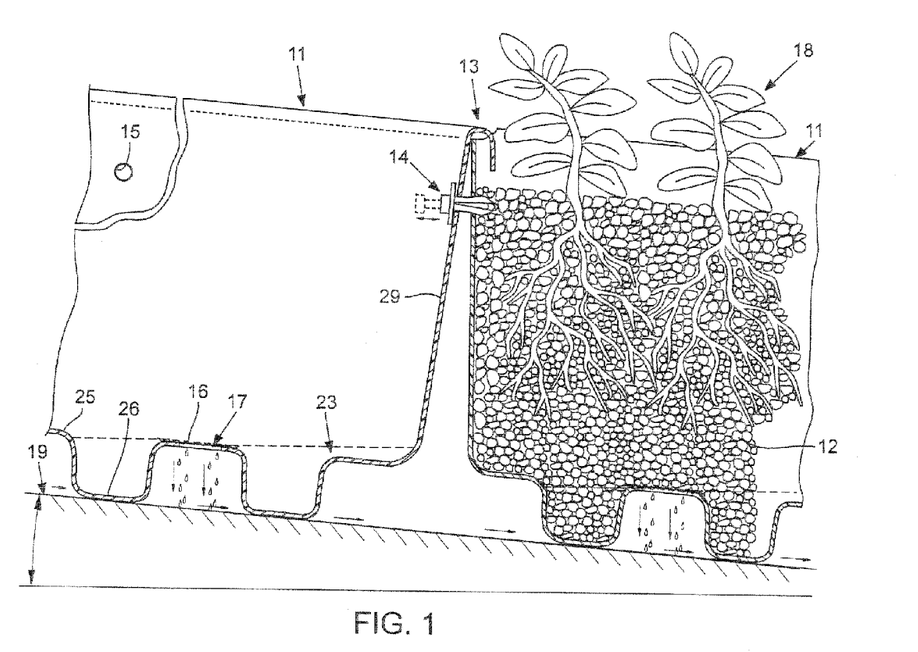
FIG. 1 is a cross-sectional view of a green roof system in accordance with some embodiments of the invention.

FIG. 1 is a cross-sectional view of a green roof system in accordance with some embodiments of the invention.

Referring to FIG. 1 a green roof system comprises a plurality of trays 11 disposed on a roof surface 19. The trays 11 contain an absorbent medium 12 and may contain vegetation 18. The trays are connected together along their adjoining edges by a connecting lip 13 and are held firmly together by a securing device 14. The securing device 14 may penetrate connecting holes 15 in vertical sidewalls of the trays 11. As shown in FIG. 1, excess water that is not absorbed by the absorbent medium 12 may leave the trays 11 through drain holes 16 (see FIG. 4).

The trays 11 may be approximately square-shaped having four flat side panels or sidewalls 29 and a corrugated bottom wall 23. The trays 11 may be semi-gloss black or green in color. The trays 11 may be composed of partially recycled 100 mil polypropylene. In this case, approximately 25% of each tray 11 may be made from recycled polypropylene resin. Alternatively, the trays 11 may be composed of 75 to 150 (preferably 100) mil polyethylene, approximately 25% of which may be recycled post industrial polyethylene. The trays 11 may be manufactured by a vacuum forming technique. Alternatively, the trays 11 may be manufactured by an injection molding process. The vertical side panels 29 of each tray 11 may have a 5 degree draft or slope to enhance drainage. The trays 11 may have a standard depth of approximately 4⅝".

The absorbent medium 12 may comprise both a soil mix and an absorbent material. The soil mix may be an engineered, light-weight blend consisting of inorganic and organic components. The absorbent material may be a superabsorbent water additive. As an example, ZEBA® from Absorbent Technologies, Inc. may be used as the absorbent material.

The vegetation 18 may be any type of plant that is suitable for the roof-top environment in the local climate. For example, the vegetation may be a design mixture of fibrous succulents that can thrive in a non-irrigated, extensive rooftop environment. The vegetation 18 may be selected based upon its USDA hardiness zone classification and local rainfall conditions.

Figure 2A:
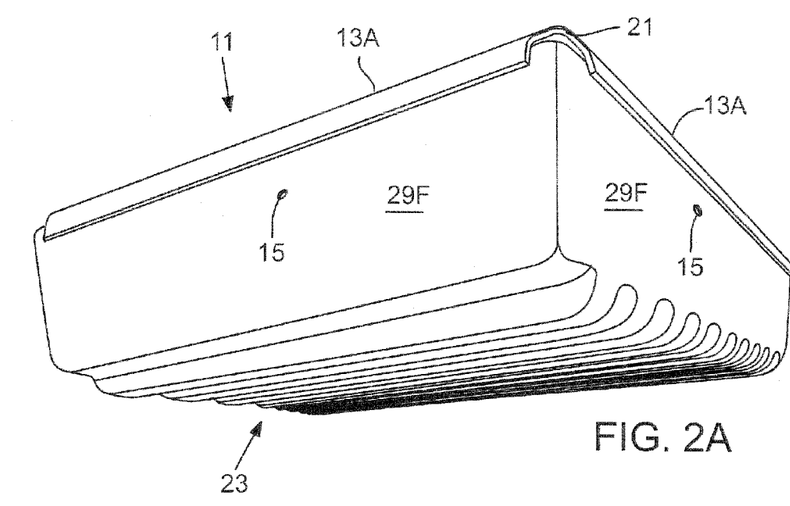
FIGS. 2A and 2B are perspective views of opposite sides of a tray for use in a green roof system of the invention.
Figure 2B:
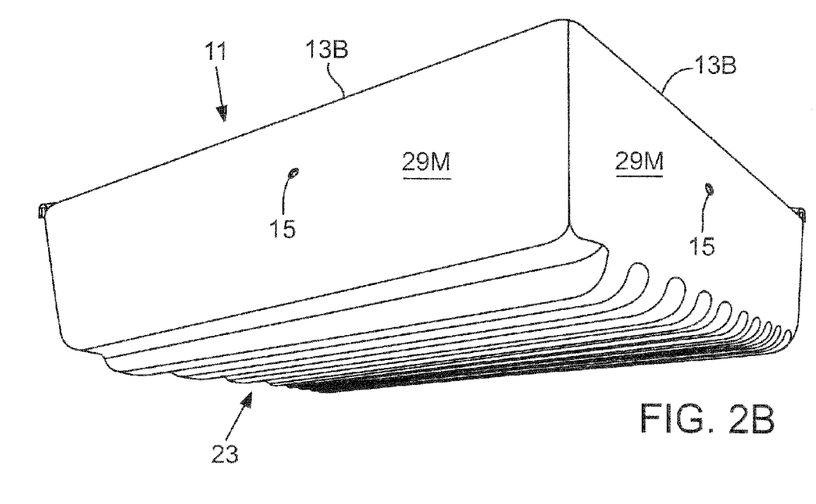

FIGS. 2A and 2B are perspective views of opposite sides of a tray for use in a green roof system of the invention.

Referring to FIGS. 2A and 2B, the trays 11 include a plurality of interconnecting lips 13. The interconnecting lips 13 may be a generally U-shaped edge 13A along a sidewall of a first tray configured to overlap a straight edge 13B along a sidewall of an adjacent tray. ("U-shaped" can include V-shaped.) As an example, a single tray 11 may be generally square in shape and have U-shaped edges 13A on two of its sidewalls. The sidewalls of the tray 11 that have the straight edges 13B may be referred to as male sidewalls 29M and the sidewalls that have the U-shaped edges 13A may be referred to as female sidewalls 29F. The U-shaped edges 13A on the female sidewalls of a tray 11 may be configured to receive the straight edges 13B of adjacent trays such that the U-shaped edges 13A overhang the straight edges 13B of the adjacent trays and extend inside the adjacent trays. Each square tray 11 may have two female sidewalls 29F which connect together about a notch 21 as shown in FIG. 2A. Opposite the female sidewalls 29F are two connected male sidewalls 29M. All of the sidewalls of the trays 11 may have connecting holes 15.

FIGS. 3 and 3A-C are cross-sectional views of a method for connecting trays of a green roof system according to an embodiment of the invention.

Figure 3:
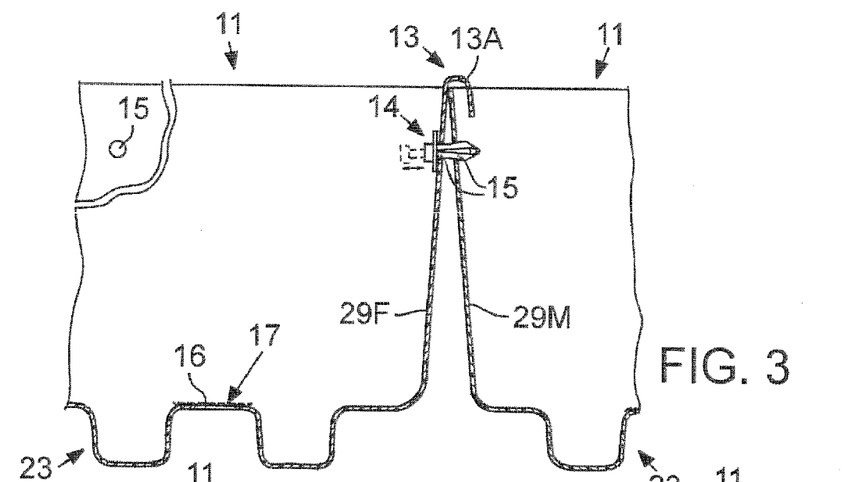
FIGS. 3 and 3A-B are cross-sectional views and FIG. 3C is an end view of a method for connecting trays of a green roof system according to an embodiment of the invention.
Figures 3A, 3B, 3C:
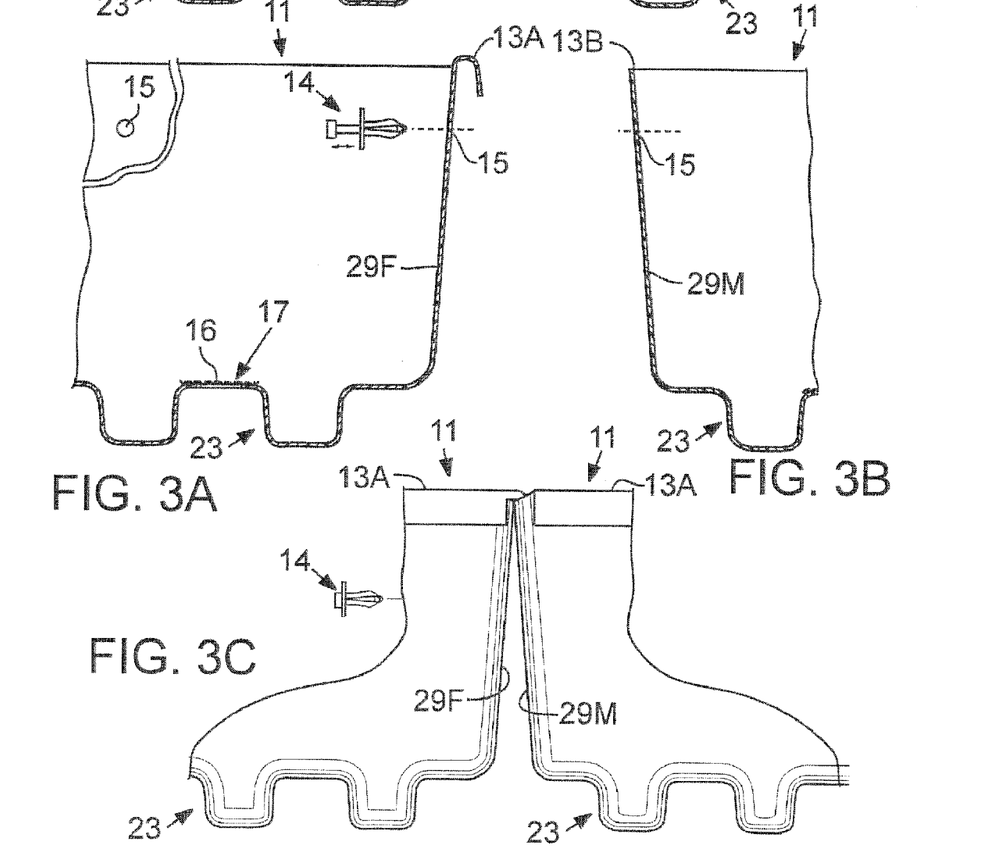

Referring to FIGS. 3 and 3A-C, a female sidewall 29F of a tray may be connected to a male sidewall 29M of an adjacent tray by positioning the edge of the female sidewall 29F so as to overlap the edge of the male sidewall 29M of the adjacent tray. As best shown in FIG. 3, the U-shaped edge 13A of the female sidewall 29F may extend inside the adjacent tray. The facing sidewalls of adjoining trays may be further secured together by the securing device 14. The securing device 14 may penetrate connecting holes 15 in the adjacent sidewalls of the adjacent trays. As an example, the securing device 14 may be a quick-lock fastener. The quick-lock fastener is inserted through the connecting holes 15 and then actuated to secure the adjacent trays 11 together. An example of a quick-lock fastener suitable for this application is a Fastex Tuflok™. In some cases, both the interconnecting lip 13 and the securing device 14 are used to secure adjacent trays together. This configuration may be referred to as a 'double locking system'. However, in some cases, the securing device 14 is not used, so that only the interconnecting lip 13 is used to secure adjacent trays together.

Figure 4:
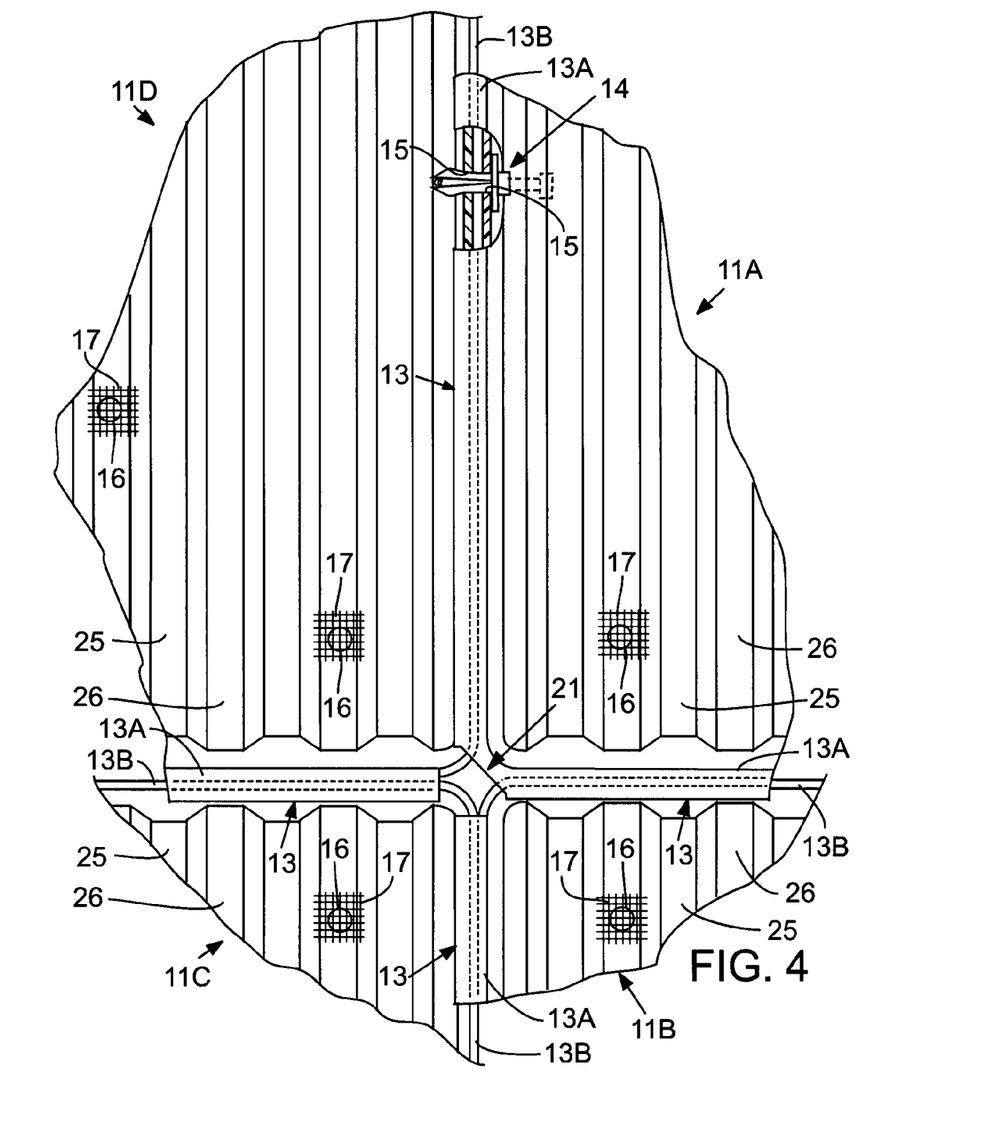
FIG. 4 is a partial plan view of several trays connected together in accordance with an embodiment of the invention.

FIG. 4 is a partial plan view of several trays connected together in accordance with an embodiment of the invention.

Referring to FIG. 4, four trays 11 are connected together as described with reference to FIG. 3 above. The trays 11A, 11B, 11C, and 11D are connected together in a grid-type configuration thereby allowing large portions of a roof structure to be covered by a system of interconnected trays. The notch 21 in the corner of tray 11A accommodates the curved male edges at the adjacent corners of trays 11B and 11D. Since an interconnecting lip 13 is used to secure each of the adjacent trays together, there is no gap between sidewalls of adjacent trays. Therefore, the roofing system of the invention provides better roof surface area utilization and coverage than conventional systems. The interconnecting lip design of the trays also prevents soil mixture from spilling in between adjacent trays, thereby preventing other problems associated with conventional systems. Further, the interconnecting lip design of the invention provides easy installation that does not require installation of screws or bolts.

Each of the trays 11 contains multiple drain holes 16, each having a drain hole cover 17. The drain hole cover 17 may be a screen for preventing the absorbent medium 12, or roots associated with the vegetation 18, from leaving the tray 11 through the drain hole 16.

Figures 5, 6:
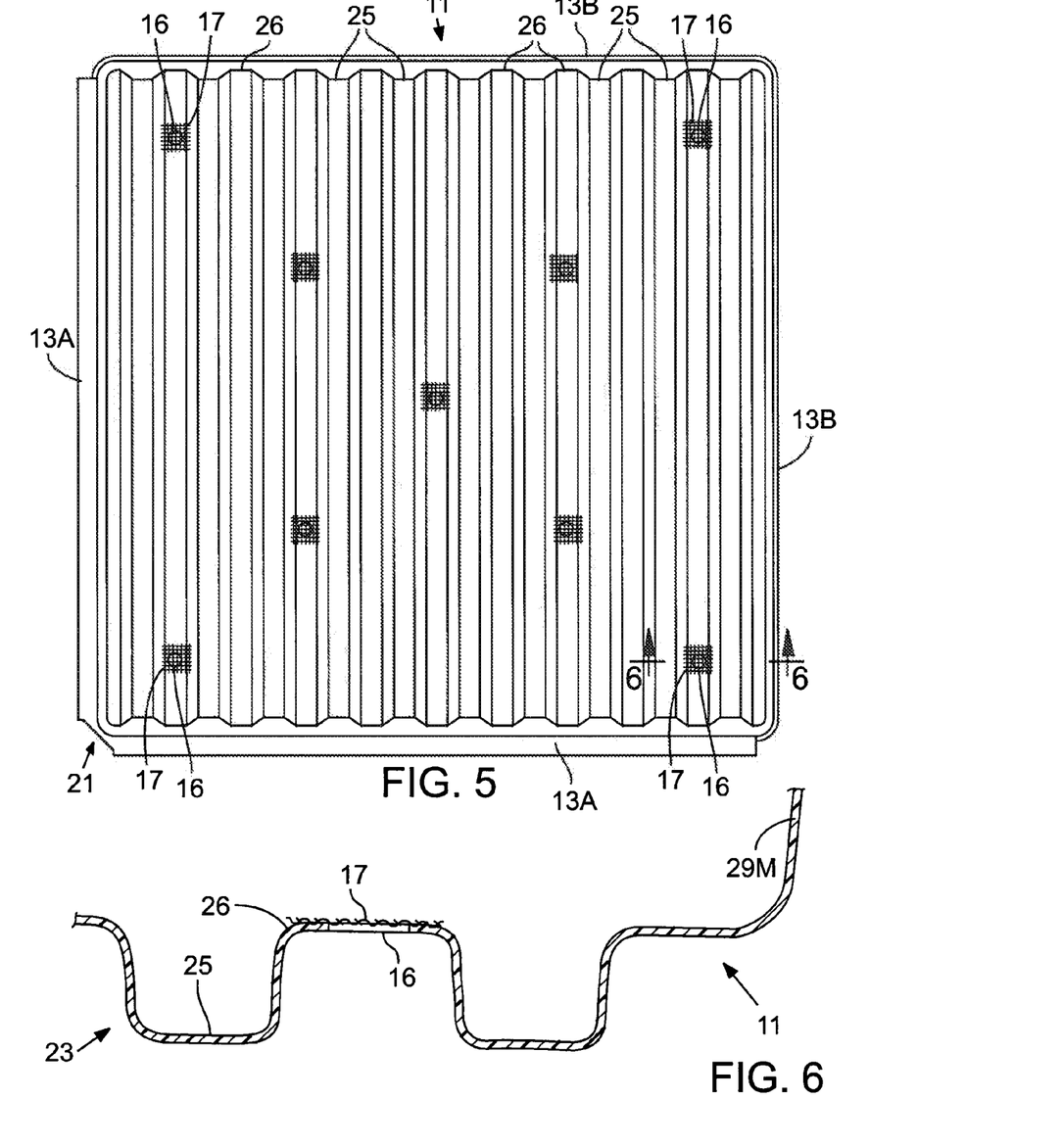
FIG. 5 is a plan view of a single tray illustrating drain holes in the tray and the arrangement of complementary interconnecting male and female edges.
FIG. 6 is a partial cross-sectional view of the tray of FIG. 5 illustrating drain hole covers over the drain holes in the tray.
Figure 7:
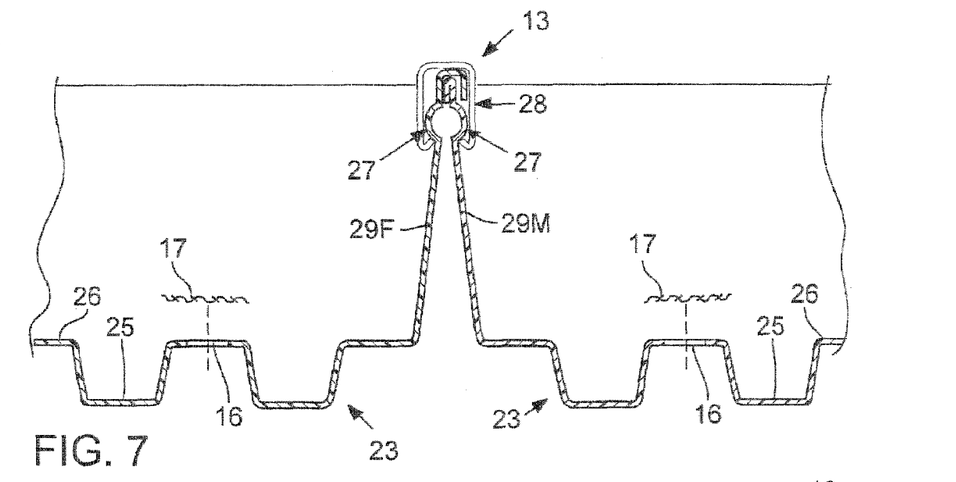
FIGS. 7 and 7A-C are cross-sectional views illustrating trays connected together according to an embodiment of the invention.
Figures 7A, 7B, 7C:
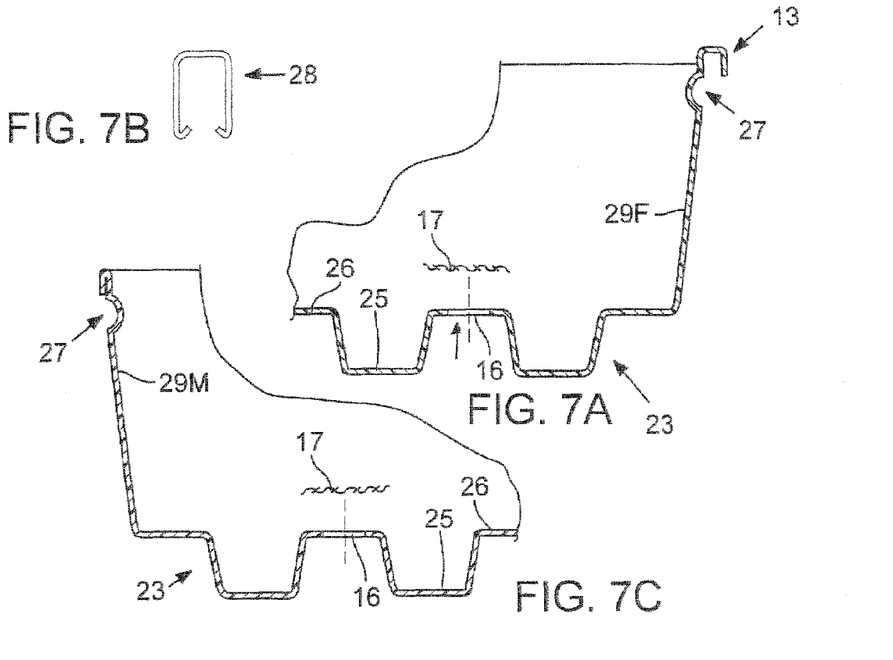

FIG. 5 is a plan view of a single tray illustrating drain holes in the tray and the arrangement of complementary interconnecting male and female edges. FIG. 6 is a partial cross-sectional view of the tray of FIG. 5 illustrating drain hole covers over the drain holes in the tray.

Referring to FIGS. 1, 5 and 6, each tray 11 comprises a corrugated bottom panel 23. The bottom panel 23 of each tray may be composed of eleven, parallel, raised ribs 26 and ten, parallel, recessed flutes 25. Some of the ribs 26 may have drain holes 16. The tray 11 may have nine drain holes 16 arranged in a 'St Andrews' cross-type pattern. Each drain hole 16 may have an approximately ⅜" diameter. The ribs 26 and flutes 25 may be ¾" in width. Each flute 25 may be approximately ⅝" deep. The purpose of the flutes 25 is to act as a cistern and store water to aid hydration of the growing media during extensive dry periods. See FIG. 1 showing retained water in the flutes. Other numbers, sizes, and arrangements of the drain holes 16, the ribs 26, and the flutes 25 are within the spirit and scope of the invention.

Referring to FIG. 6, a drain hole cover 17, as described above with respect to FIG. 4, covers each of the drain holes 16 in the tray 11. As an example, the drain hole cover 17 may be a mesh screen. The drain hole cover may be secured to the flute 25 over the drain hole 16 and may be made of any suitable material including copper, stainless steel, or another metal or metal alloy or a polymeric or glass fiber mesh. The drain hole cover 17 may be secured to the flute 25 over the drain hole 16 using a glue or adhesive material. Alternatively, the drain hole cover 17 may be molded into the flute 25 over the drain hole 16. For example, a drain hole cover 17 may be placed into an injection mold so that when the tray 11 is manufactured, the drain hole cover 17 is integrally molded into the tray. According to preferred embodiments, the drain hole cover 17 is a mesh screen made of 0.011" copper or stainless steel wire or other mesh material and is molded into the tray 11.

FIGS. 7 and 7A-C are cross-sectional views illustrating trays connected together according to an alternative embodiment of the invention.

Referring to FIGS. 7 and 7A-C, the sidewalls of the trays 11 may include a protruded portion 27 downwardly adjacent to lip 13 along the upper edge thereof. The protruded portion 27 may be a rounded protrusion or bulge extending inwardly from the plane of the sidewalls of the tray 11. Adjacent trays are positioned such that the interconnecting lip 13 of the female sidewall 29F of a first tray overlaps the male sidewall 29M of a second tray. Then, a U-shaped spring clip 28 may be installed over the interconnecting lip 13 so as to engage with the protruded portions 27 and thereby secure the adjacent trays together.

Figure 8:
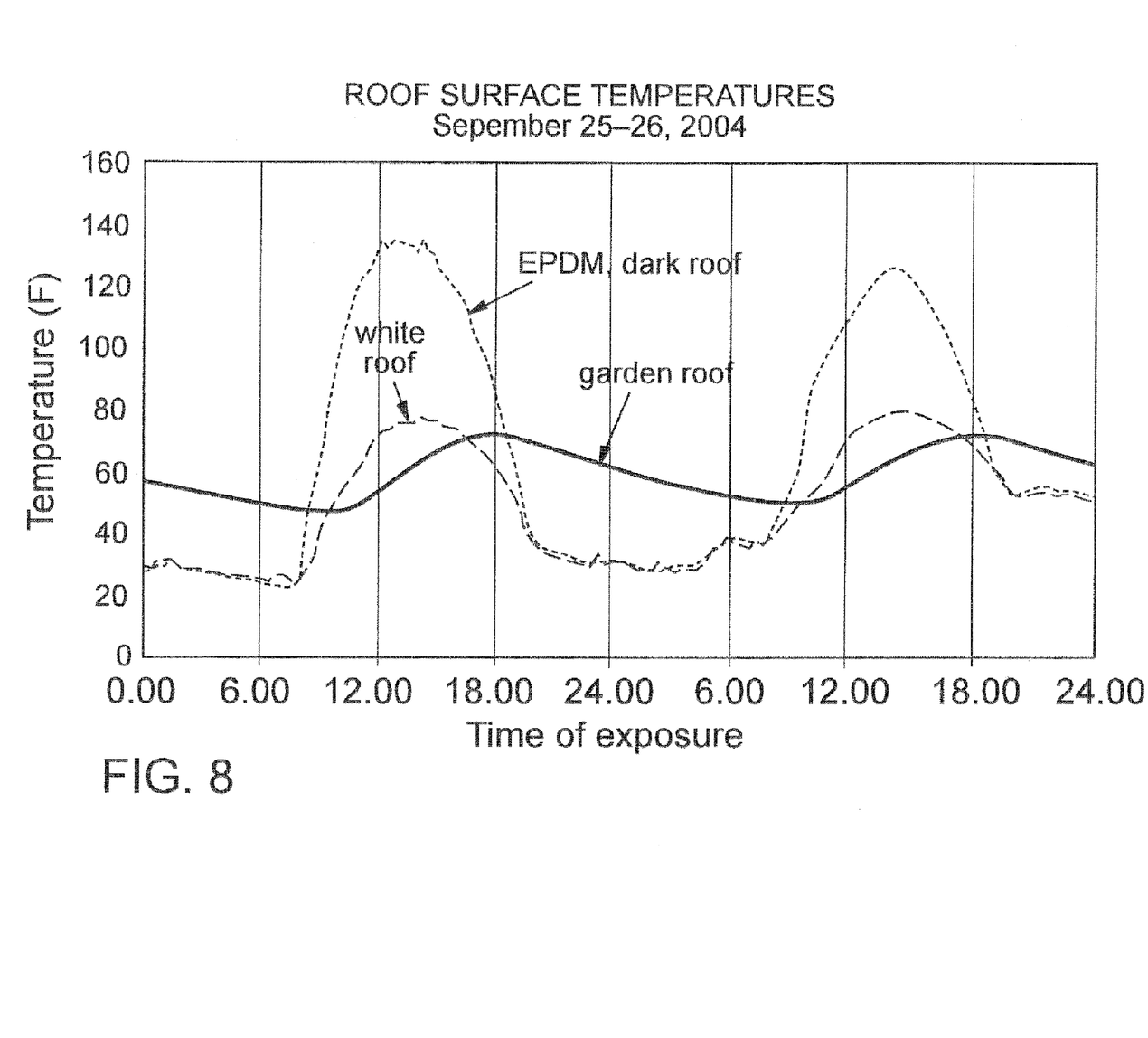
FIG. 8 is a plot of roof surface temperatures corresponding to various types of roof coverings.

FIG. 8 is a plot of roof surface temperatures corresponding to various types of roof coverings, from A. Dürr, Roof Greening: An Ecological Balance (1995), republished in U.S. Department of Energy, Federal Technology Alert Publication DOE/EE-0298, Sep. 2004.

As shown in FIG. 8, when the invention is utilized, the roof surface temperature varies only about 25 degrees over a 48-hour period. However, when conventional roof coverings are used, the roof surface temperature varies between about 50 and 110 degrees, depending on the type of roof covering used. Consequently, roof coverings in accordance with the invention can provide significant energy savings by minimizing the variation of roof surface temperature and the corresponding temperature inside a building.

Figure 9:
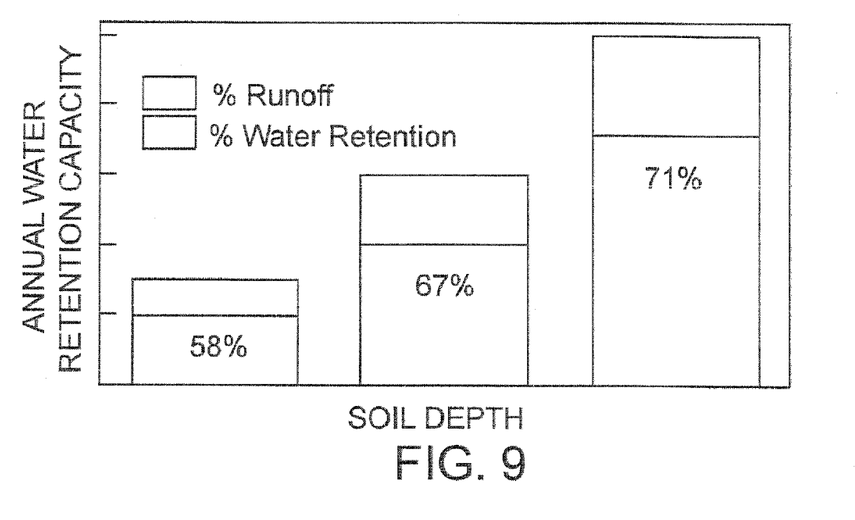
FIG. 9 is a plot of water retention corresponding to various depths of soil.

FIG. 9 is a plot of water retention corresponding to various depths of soil, from A. Dürr.

As shown in FIG. 9, increased soil depth leads to improved water retention capabilities. When the trays of the invention are manufactured with the standard depth of 4⅝", the water retention of the trays corresponds to the 71% data point on the graph. Conventional methods with less soil depth have significant reduction in water retention as shown by the 58% and 67% data points in the graph.

Figure 10:
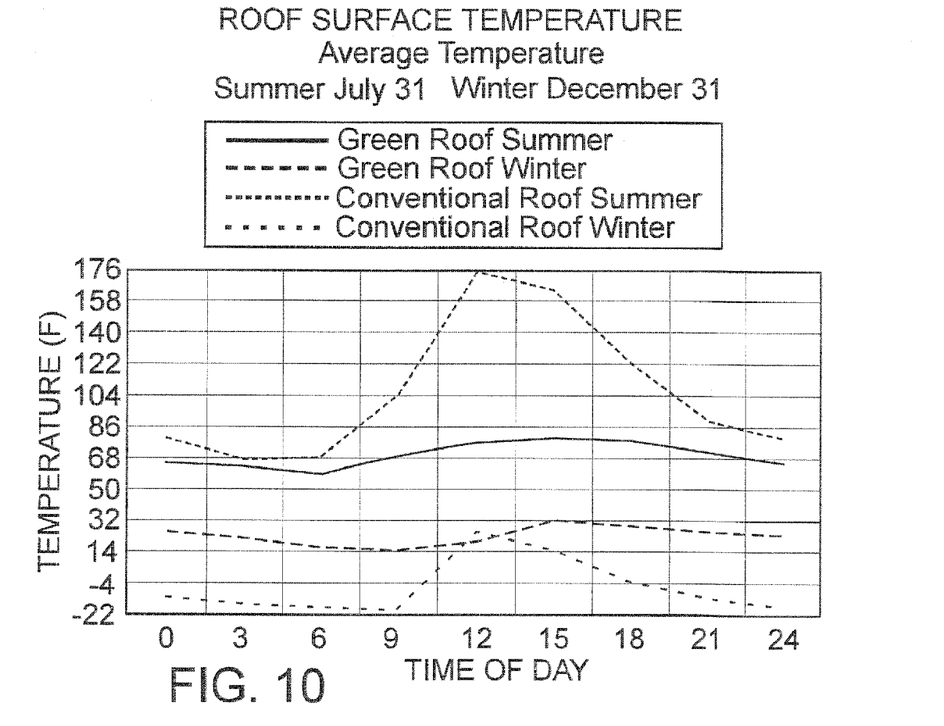
FIG. 10 is a plot of roof surface temperatures in the summer and winter corresponding to conventional roof coverings and roof coverings in accordance with embodiments of the invention.

FIG. 10 is a plot from A. Dürr of roof surface temperatures in the summer and winter corresponding to conventional roof coverings and green roof coverings in general, per A. Dürr.

As shown in FIG. 10, during the summer, the roof surface temperature of a roof employing the invention only varies about 20 degrees over a 24-hour period. In contrast, the roof surface temperature of a roof employing a conventional roof covering varies about 100 degrees over a 24-hour period in the summer. During the winter, the roof surface temperature of a roof employing the invention also only varies about 20 degrees over a 24-hour period. The roof surface temperature of a roof employing a conventional roof covering varies about 50 degrees under the same conditions.

As described above, the interlocking tray system of the invention provides gap-less coverage of roof surfaces without installation of screws or bolts. This allows better roof surface area utilization and prevents the adverse effects of soil mixture spillage between adjacent trays. Utilizing the green roof system of the invention. water retention can be maximized and roof surface temperature variation can be minimized. Consequently, the green roof system of the invention provides reduced energy costs, reduced runoff during rainy periods, and environmental advantages, such as increased green space in commercial or other populated areas.

Buildings employing the green roof system of the invention may also realize reduced noise pollution due to the sound-dampening qualities of the vegetation and the absorbent medium in the trays.

Figures 11, 12:
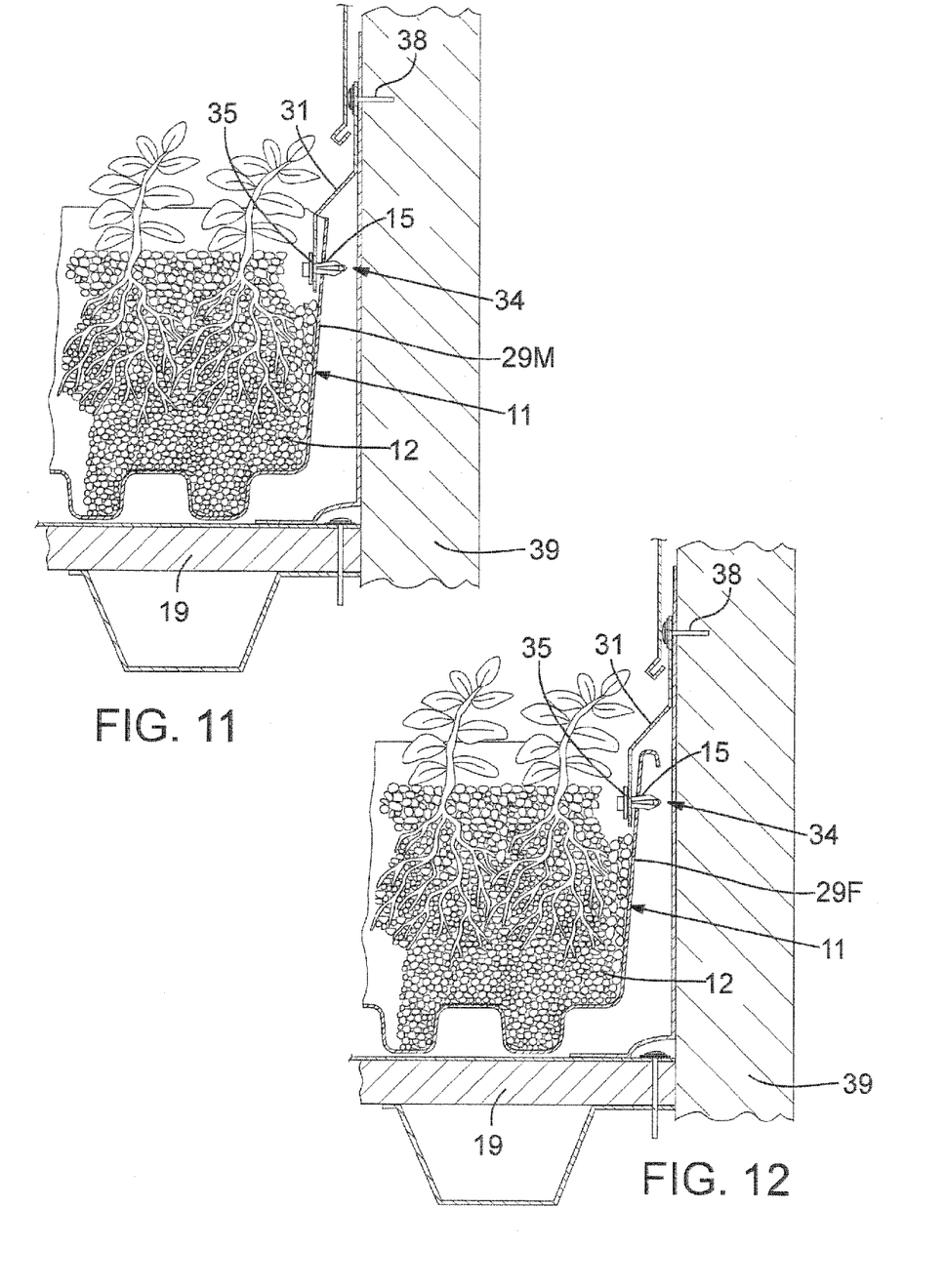
FIG. 11 is a cross-sectional view of an interlocking tray system including wall anchor flashing interlocked with a male tray sidewall.
FIG. 12 is a cross-sectional view of an interlocking tray system including wall anchor flashing interlocked with a female tray sidewall.

FIG. 11 is a cross-sectional view of an interlocking tray system including wall anchor flashing interlocked with a male tray sidewall. FIG. 12 is a cross-sectional view of an interlocking tray system including wall anchor flashing interlocked with a female tray sidewall.

Referring to FIGS. 11 and 12, an interlocking tray system according to an embodiment of the invention includes a wall anchor flashing 31. The wall anchor flashing 31 may be secured to a parapet wall 39 using a fastener 38. The wall anchor flashing 31 overhangs a male sidewall 29M (FIG. 11) or a female sidewall 29F (FIG. 12) of a tray 11. The wall anchor flashing 31 may include a connecting hole 35 and a securing device 34. The securing device 34 penetrates the connecting hole 35 in the wall anchor flashing 31 and the corresponding connecting hole 15 in the tray 11 to secure the wall anchor flashing 31 to the tray 11.

Figure 13:
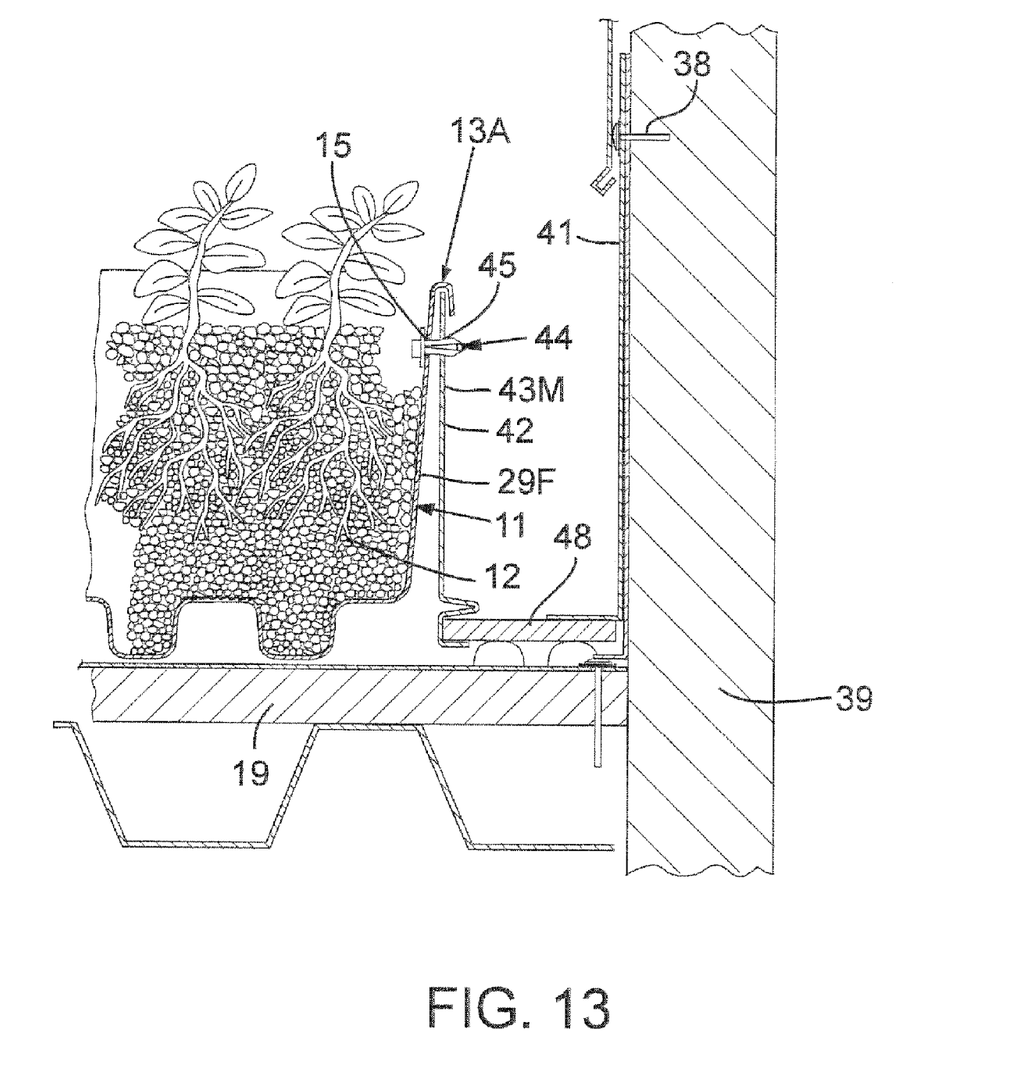
FIG. 13 is a cross-sectional view of an interlocking tray system including walk pad trim flashing interlocked with a female tray sidewall.
Figure 14:
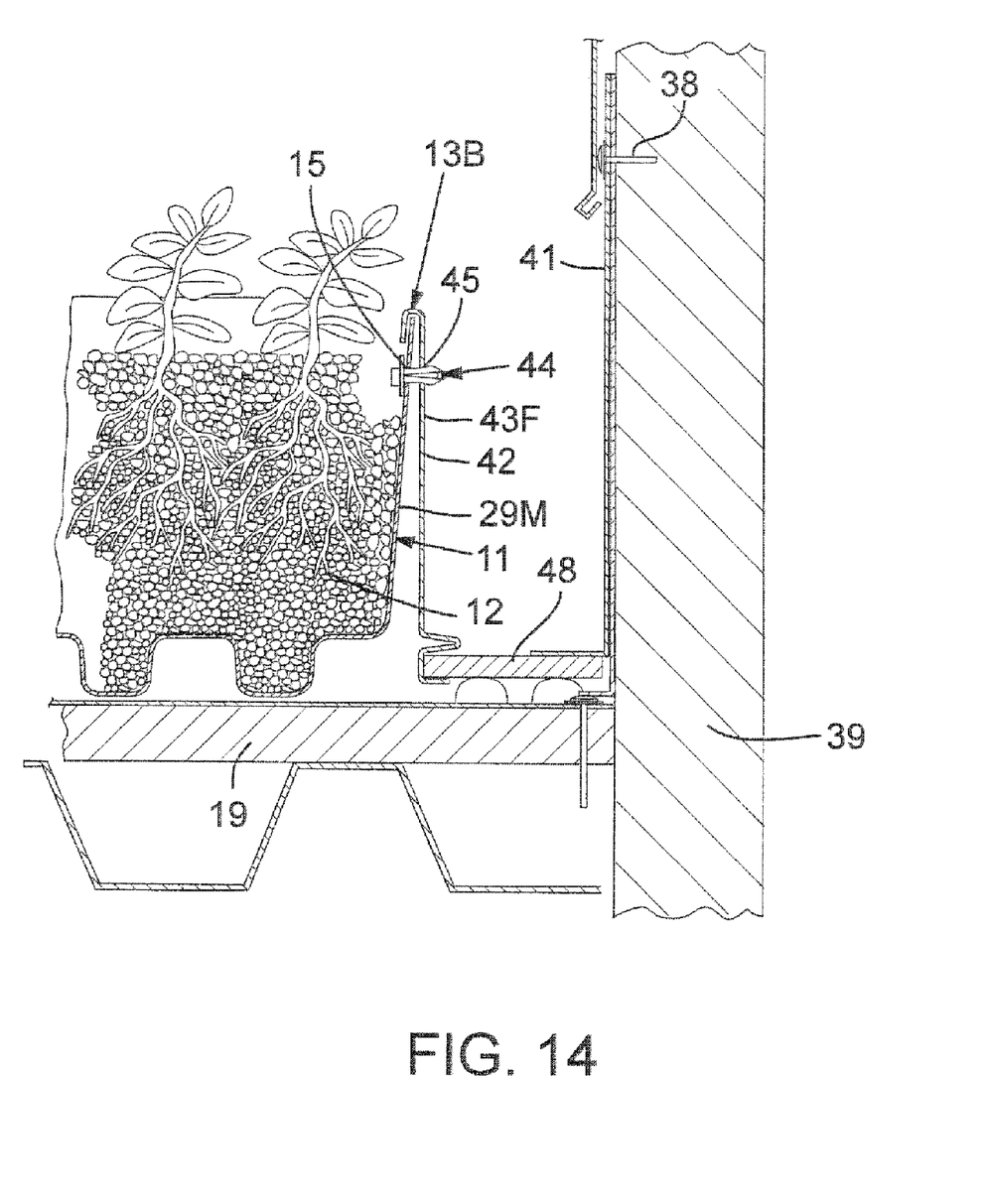
FIG. 14 is a cross-sectional view of an interlocking tray system including walk pad trim flashing interlocked with a male tray sidewall.

FIG. 13 is a cross-sectional view of an interlocking tray system including walk pad trim flashing interlocked with a female tray sidewall. FIG. 14 is a cross-sectional view of an interlocking tray system including walk pad trim flashing interlocked with a male tray sidewall.

Referring to FIGS. 13 and 14, an interlocking tray system according to an embodiment of the invention includes a walk pad wall flashing 41, a walk pad 48, and a walk pad trim flashing 42. The walk pad wall flashing 41 may be secured to a parapet wall 39 using a fastener 38. As shown in FIG. 13, a male edge 43M of the walk pad trim flashing 42 interlocks with a U-shaped edge 13A of a female sidewall 29F of a tray 11. As shown in FIG. 14, a female edge 43F of the walk pad trim flashing 42 interlocks with a straight edge 13A of a male sidewall 29M of a tray 11. The walk pad trim flashing 42 may include a connecting hole 45 and a securing device 44. The securing device 44 penetrates the connecting hole 45 in the walk pad trim flashing 42 and the corresponding connecting hole 15 in the tray 11 to secure the walk pad trim flashing 42 to the tray 11.

Figure 15:
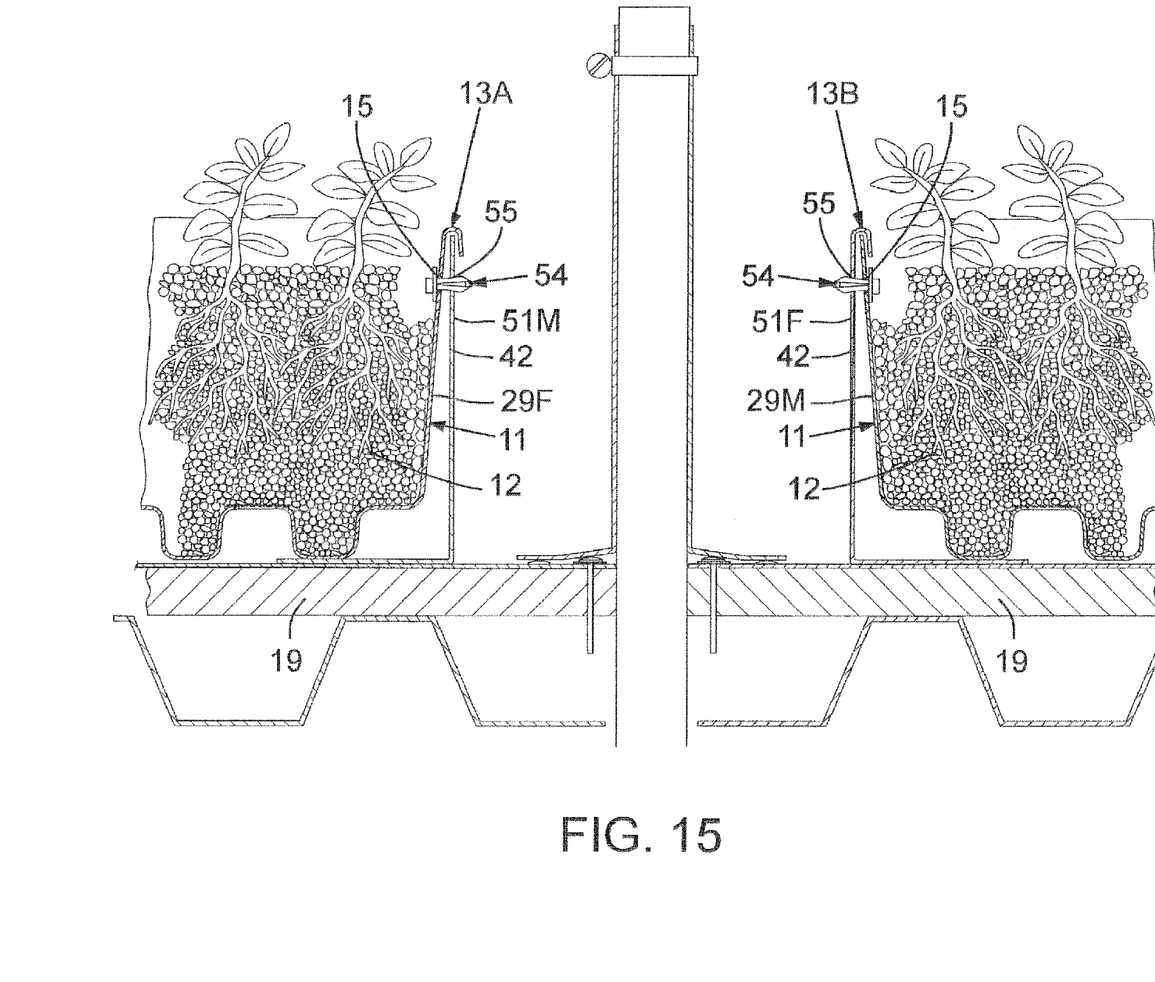
FIG. 15 is a cross-sectional view of an interlocking tray system including male and female tray edges.

FIG. 15 is a cross-sectional view of an interlocking tray system including male and female tray edges.

Referring to FIG. 15, an interlocking tray system according to an embodiment of the invention includes a male tray edge 51M and/or a female tray edge 51F. The male tray edge 51M interlocks with a U-shaped edge 13A of a female sidewall 29F of a tray 11. The female tray edge 51F interlocks with a straight edge 13B of a male sidewall 29M of a tray 11. The male and female tray edges, 51M and 51F, may each include a connecting hole 55 and a securing device 54. The securing device 54 penetrates the connecting hole 55 and the corresponding connecting hole 15 in the tray 11 to secure the male and female tray edges, 51M and 51F, to the tray 11.

FIGS. 11 through 15 illustrate embodiments of the invention for securing an interlocking tray system to various rooftop elements such as HVAC components, parapet walls, and vents. Securing the interlocking tray system to the rooftop elements allows the system to integrate with existing rooftop configurations and prevents wind uplift from displacing and/or damaging trays.

The foregoing is illustrative of the invention and is not to be construed as limiting thereof. Although a few example embodiments of the invention have been described, those skilled in the art will readily appreciate that many modifications are possible in the example embodiments without materially departing from the novel teachings and advantages of the invention. For example, the trays could be hexagonal, with alternating male and female sidewalls. Accordingly, all such modifications are intended to be included within the scope of the invention as defined in the following claims.

The invention claimed is:

1. A vegetation roofing system comprising:
a first tray;
a second tray adjacent to the first tray;
each of the first tray and the second tray including:
  a bottom panel;
  a plurality of vertical side panels interconnected at corners; and
  at least one drain hole disposed in the bottom panel to release liquid from each of the first tray and the second tray;
wherein an interconnecting lip formed in at least one of the vertical side panels couples adjacent vertical side panels of the first and second trays;
a walk pad trim flashing connected to the first tray via an interconnecting lip along a first one of the vertical side panels of the first tray;
a walk pad connected to the walk pad trim flashing and extending along substantially entire length of the first one of the vertical side panels of the first tray; and
a walk pad wall flashing connected to the walk pad and a wall;
the interconnecting lip including a U-shaped upper edge integrally formed along an upper edge of the at least one of the vertical side panels and overlapping a straight upper edge of an adjacent vertical side panel so as to cover an entire length of a gap between the corners of the adjacent vertical side panels of the first and second trays.

2. The system of claim 1, wherein the walk pad trim flashing comprises a U-shaped female edge integrally formed in the walk pad trim flashing and the female edge is interlocked with one of the vertical side panels of the first tray.

3. The system of claim 1, wherein the walk pad trim flashing comprises a straight male edge integrally formed in the walk pad trim flashing and the male edge is interlocked with one of the U-shaped upper edges of the vertical side panels of the first tray.

4. The system of claim 1, wherein the walk pad trim flashing comprises a connecting hole and a securing device penetrates a connecting hole of the first tray and the connecting hole of the walk pad trim flashing, thereby securing the first tray to the walk pad trim flashing.

5. A vegetation roofing tray, comprising:
a bottom panel;
at least four vertical side panels interconnected at corners and integrally formed with the bottom panel; and
at least one drain hole in the bottom panel to release liquid from the vegetation roofing tray;
wherein two of the vertical side panels include a U-shaped upper edge integrally formed along an entire length of each of the two vertical side panels between the corners and two of the vertical side panels include a straight upper edge mutually arranged so that the straight upper edge can be received in the U-shaped upper edge of an adjoining tray along an entire length of the adjacent tray, the U-shaped upper edge overlapping opposed faces of the side panels so that soil and water fall into the adjoining trays.

6. The tray of claim 5, wherein each of the plurality of vertical side panels has an approximately 5 degree slope.

7. The tray of claim 5, wherein the bottom panel comprises:
a plurality of raised ribs, each of the raised ribs extending along a substantially entire length of the bottom panel; and
a plurality of recessed flutes, wherein the at least one drain hole is disposed on at least one of the raised ribs.

8. The tray of claim 5, further comprising a drain hole cover disposed over each of the drain holes.

9. The tray of claim 8, wherein the drain hole cover is a flat mesh screen.

10. The tray of claim 9, wherein the flat mesh screen comprises copper.

11. The tray of claim 9, wherein the flat mesh screen comprises stainless steel.

12. The tray of claim 8, further comprising a means for securing the drain hole cover over the drain hole.

13. The tray of claim 12, wherein the means for securing is an adhesive.

14. The tray of claim 5, wherein at least one of the plurality of vertical side panels includes a connecting hole.

15. The tray of claim 5, further comprising an absorbent medium and vegetation disposed on the bottom panel.

16. The tray of claim 15, wherein the absorbent medium includes a soil mixture and an absorbent material.

17. The tray of claim 5, wherein the tray is approximately square.

18. The tray of claim 5, wherein the two vertical side panels including the U-shaped upper edges are adjacent to each other.

19. The tray of claim 18, further comprising a notch disposed in the corner between the two vertical side panels including the U-shaped upper edges.

20. A vegetation roofing system, comprising:
a first tray; and
a second tray adjacent to the first tray;
each of the first tray and the second tray including:
a bottom panel;
a plurality of vertical side panels; and
wherein the plurality of vertical side panels are integrally formed with the bottom panel; and
at least one drain hole disposed in the bottom panel to release liquid from each of the first tray and the second tray;
wherein an interconnecting lip couples adjacent vertical side panels of the first and second trays, the interconnecting lip being formed by a U-shaped upper edge integrally formed along an entire length of one of the adjacent vertical side panels between corners thereof and overlapping a straight upper edge of the other of the adjacent vertical side panels so as to cover a gap between the first tray the second tray.

21. The system of claim 20, wherein the U-shaped upper edge of a substantially entire length of one of the vertical side panels of the first tray overhangs the straight upper edge of one of the vertical side panels of the second tray such that the interconnecting lip extends inside the second tray.

22. The system of claim 20, further comprising a securing device penetrating adjacent connecting holes of the first and second trays.

23. The tray of claim 22, wherein the securing device is a quick-lock fastener.

24. The system of claim 20, wherein each of the first tray and the second tray further includes a protruded portion, the system further comprising a clip engaging the protruded portions on the first and second trays.

25. The system of claim 24, wherein the protruded portions are disposed on the vertical side panels of the first and second trays and protrude toward an interior of the first and second trays from the vertical side panels.

26. The system of claim 20, further comprising a wall anchor flashing overhanging one of the vertical side panels of the first tray.

27. The system of claim 26, further comprising a fastener securing the wall anchor flashing to a wall.

28. The system of claim 26, wherein the wall anchor flashing comprises a connecting hole and a securing device penetrates a connecting hole of the first tray and the connecting hole of the wall anchor flashing, thereby securing the first tray to the wall anchor flashing.

29. A vegetation roofing tray, comprising:
a bottom panel, the bottom panel including;
a plurality of raised ribs extending in parallel along a substantially entire length of the bottom panel;
a plurality of recessed flutes interposed between the raised ribs and extending in parallel along the substantially entire length of the bottom panel; and
a plurality of drain holes disposed on the raised ribs to release liquid from the vegetation roofing tray;
four vertical side panels interconnected at corners, each of the vertical side panels including a connecting hole, wherein two adjacent vertical side panels include an integrally-formed U-shaped upper edge extending along the vertical side panels and two adjacent vertical side panels include a straight upper edge mutually arranged so that the straight upper edge can be received in the U-shaped upper edge of an adjacent tray; and
a notch disposed in a corner between the two adjacent vertical side panels that includes the U-shaped upper edge, the notch configured to receive corners of vertical side panels of adjacent trays;
the U-shaped upper edge extending along an entire length of the vertical side panels between the corners so as to overlap any gap between vertical side panels of adjacent trays.

30. The tray of claim 29, further comprising a drain hole cover over each of the drain holes.

* * * * *